(12) United States Patent  
Friedman et al.

(10) Patent No.: US 9,529,099 B2  
(45) Date of Patent: Dec. 27, 2016

(54) MICROCAVITY PLASMA PANEL RADIATION DETECTOR

(71) Applicants: Integrated Sensors LLC, Ottawa Hills, OH (US); University of Michigan, Ann Arbor, MI (US)

(72) Inventors: Peter S. Friedman, Toledo, OH (US); Daniel S. Levin, Ann Arbor, MI (US)

(73) Assignees: Integrated Sensors, LLC, Ottawa Hills, OH (US); University of Michigan, Ann Arbor, MI (US)

( * ) Notice: Subject to any disclaimer, the term of this patent is extended or adjusted under 35 U.S.C. 154(b) by 279 days.

(21) Appl. No.: 14/080,218

(22) Filed: Nov. 14, 2013

(65) Prior Publication Data

US 2015/0001411 A1     Jan. 1, 2015

Related U.S. Application Data

(60) Provisional application No. 61/796,549, filed on Nov. 14, 2012, provisional application No. 61/852,346, filed on Mar. 15, 2013.

(51) Int. Cl.
    *G01T 1/185*        (2006.01)
    *G01T 1/29*         (2006.01)
    (Continued)

(52) U.S. Cl.
    CPC ........... *G01T 1/2935* (2013.01); *H01J 47/002* (2013.01); *G01T 1/185* (2013.01); *G01T 1/2921* (2013.01); *H01J 47/02* (2013.01)

(58) Field of Classification Search
    CPC .............................. G01T 1/2921; G01T 1/181
See application file for complete search history.

(56) References Cited

U.S. PATENT DOCUMENTS 2,876,360 A     3/1959    Victoreen
3,614,437 A    10/1971    Allemand et al.
(Continued)

FOREIGN PATENT DOCUMENTS

EP         1274115 A2     1/2003

OTHER PUBLICATIONS

Pinto et al., Micropattern gas detector technologies and applications the work of RD51 collaboration, Nov. 19, 2010, IEEE Nuclear Science Symposium 2010 Conference Record, pp. 1-6.*

(Continued)

*Primary Examiner* — Christine Sung
(74) *Attorney, Agent, or Firm* — Miles & Stockbridge P.C.

(57) ABSTRACT

A position-sensitive ionizing-radiation counting detector includes a first substrate and a second substrate, and a defined gas gap between the first substrate and the second substrate. The first and second substrates comprise dielectrics and a discharge gas is contained between the first and second substrate. A microcavity structure comprising microcavities is coupled to the second substrate. An anode electrode is coupled to the first substrate and a cathode electrode is coupled to the microcavity structure on the second substrate. The detector further includes pixels defined by a microcavity and an anode electrode coupled to a cathode electrode, and a resistor coupled to each of the cathode electrodes. Each pixel may output a gas discharge counting event pulse upon interaction with ionizing-radiation. The detector further includes a voltage bus coupled to each of the resistors and a power supply coupled to at least one of the electrodes.

20 Claims, 13 Drawing Sheets

(51) Int. Cl.
*H01J 47/00* (2006.01)
*H01J 47/02* (2006.01)

(56) References Cited

U.S. PATENT DOCUMENTS

| | | | |
|---|---|---|---|
| 3,772,521 A | 11/1973 | Perez-Mendez | |
| 3,786,270 A | 1/1974 | Borkowski et al. | |
| 3,969,624 A * | 7/1976 | Van Biesen | G03G 15/0545 378/31 |
| 4,365,159 A | 12/1982 | Young | |
| 4,392,057 A | 7/1983 | Mathieson et al. | |
| 4,591,717 A | 5/1986 | Scherber | |
| 4,816,683 A | 3/1989 | Marsden | |
| 4,937,455 A | 6/1990 | Kurz | |
| 4,999,501 A | 3/1991 | Lacy | |
| 5,223,717 A | 6/1993 | Charpak | |
| 5,688,698 A | 11/1997 | Robinson et al. | |
| 5,773,829 A | 6/1998 | Iwanczyk et al. | |
| 6,011,265 A | 1/2000 | Sauli | |
| 6,097,032 A | 8/2000 | Tanimori et al. | |
| 6,584,419 B1 | 6/2003 | Alexander | |
| 6,703,619 B2 | 3/2004 | Takahashi | |
| 6,765,213 B2 | 7/2004 | Shahar et al. | |
| 7,157,718 B2 | 1/2007 | Gianchandani et al. | |
| 7,170,066 B2 | 1/2007 | Virtanen | |
| 7,332,726 B2 | 2/2008 | Friedman et al. | |
| 7,645,996 B2 * | 1/2010 | Yang | G01N 27/70 250/336.1 |
| 7,923,930 B1 * | 4/2011 | Wedding | H01J 11/18 313/582 |
| 8,442,091 B2 * | 5/2013 | Park | H01S 3/03 372/45.01 |
| 8,952,612 B1 * | 2/2015 | Pavliscak | H01J 11/12 313/582 |
| 2002/0036269 A1 | 3/2002 | Shahar et al. | |
| 2002/0139935 A1 | 10/2002 | Klein et al. | |
| 2005/0242291 A1 | 11/2005 | Gianchandani et al. | |
| 2006/0049362 A1 | 3/2006 | Friedman et al. | |
| 2007/0200499 A1 * | 8/2007 | Eden | H01J 9/245 313/582 |
| 2008/0210878 A1 * | 9/2008 | Friedman | G01T 1/18 250/374 |
| 2010/0265078 A1 * | 10/2010 | Friedman | G01T 1/26 340/600 |
| 2010/0289413 A1 * | 11/2010 | Eden | H01J 61/82 315/167 |
| 2014/0239185 A1 * | 8/2014 | de Oliveira | G01T 1/2935 250/374 |

OTHER PUBLICATIONS

Anderson et al. "A Low-Pressure, Mircro-Strip as Chamber Operated with Secondary-Electron Emission"; Nucl. Instr. and Meth.; A346 (1994); 102106.
Contract No. DTRA01-03-C-0042; issued by the U.S. Dept. of Defense; Defense Threat Reduction Agency to Photonics Systems, Inc. on May 16, 2003 an completed Oct. 31, 2004.
Lasche et al.; "Detectin Sensitivity for Special Nuclear Materals With an Advanced Hig-Pressure Xenon Detector and Robust Fitting Analysis"; IEEE Trans. Mucl. Sci.; 48 (2001); pp. 325-329.
Sauli; GEM: A New Concept for Electron Amplification in Gas Detectors:; Nuc. Instr. and Meth.; A386 (1997); pp. 531-534.
Knoll; "Radiation Detection and Measurement" 3rd ed.; John Wiley & Sons Inc. (2000); pp. 192-194 and 509 (book cover included).
Clergeau et al.; "Operation of Sealed Microstrip Gas Chambers at the Ill"; IEEE Trans. Nucl. Sci.; 48 (2001); pp. 1075-1080.
Bateman et al.; "Studies of the Gain Properties of Microstrip Gas Counters Relevant to Their Application as X-Ray and Electron Detectors"; IEEE Trans. Nuc. Sci.; 49 (2002); pp. 1644-1650.
Bouhali et al.; "The Micromegem Detector"; Nucl. Instr. and Meth.; A459 (2001); pp. 211-220.
Ziock et al.; "A Large-Area PSPMT-Based Gamma-Ray Imager With Edge Reclamation"; IEEE Trans. Nucl. Sci.; 49 (2002); pp. 1552-1559.
Graeve et al.; "High-Resolution CMOS Imaging Detector"; Mdeical Imaging (2001); Physics of Medical Imaging: SPEI vol. 4320.
Mahler et al.; "A Portable Gamma-Ray Spectrometer Using Compressed Xenon"; IEEE Trans. Nucl. Sci.; NS-45 (1998); pp. 1029-1033.
Fehlau; Integrated Neutron/Gamma-Ray Portal Monitors for Nuclear Safeguards; IEEE Trans. Nucl. Sci; NS-41 (1994); pp. 922-926.
Nagarkar et al.; "Structured Lil Scintillator for Thermal Neutron Imaging"; IEEE Trans. Nucl. Sci.; NS-48 (2001); pp. 2330-2334.
Kurfess et al. "Coincident Compton Nuclear Medical Imager"; IEEE Nucl. Sci. Symposium; San Diego (2001).
Breskin; "Advances in Gas Avalanche Radiation Detectors for Biomedical Applicaitons"; Nucl. Instr. and Meth.; A454 (2000); pp. 26-39.
Angelini et al.; "The Micro-Gap Chamber"; Nucl. Inst. and Meth; A335 (1993); pp. 69-77.
Beckers et al.; "Optimization of Microstrip Gas Chamber Design and Operating Conditions"; Nucl. Instr. and Meth.; A346 (1994); pp. 95-101.
Breskin et al.; "Ion-Induced Effects in GEM and GEM/MHSP Gaseous Photomultipliers for the UV and Visible Spectral Range"; Nuc. Instr. and Meth.; A553 (2005); pp. 46-52.
Eden et al.; "Recent Advances in Microcavity Plasma Devices and Arrays: A Versatile Photonic Platform"; J. Phys. D App. Phys. 38 (2005); pp. 1644-1648.
Friedman; "A New Calss of Low Cost, High Perfromance, Ratiation Detectors"; 2005 IEEE Nuclear ; Science Symposium & Medical Imaging Conf. (Puerto Rico); NSS Conf. Record; Paper J03-7; Dec. 2005; pp. 2815-2822.
Ketzer et al.; "Triple Gem Tracking Detectors for Compass"; IEEE Trans. Nucl. Instr. and Meth.; A386; 1997; pp. 531-534.
Friedman; Plasma Panel Sensors As Scintillation Detectors: 2006 IEEE Nuclear Science Symposium & Medical Imaging Conf. (San Diego); NSS Conf. Record; Paper N30-136; Feb. 2007; pp. 1150-1159.
Kurfess et al.; "Considerations for the Next Comption Telescope Mission"; the 5th Compton Symposium; ed. M.L. McConnell and J.M. Ryan; AIP Conference Proceedings; 2000; p. 510.
Bonin et al.; "A Pixel Chamber to Monitor the Beam Performances in Hadron Therapy"; Nuclear Instruments & Methods in Physics Research; Oct. 13, 2003; Elsevier B.V.; pp. 674-686.
Amerio et al.; Dosimetric Characterizatin of a Large Area Pixel-Segmented Ionizatin Chamger; Med. Phus. 31 (2); Feb. 2004; Am. Assoc. Phys. Med.; pp. 414-420.
Eom et al.; "Feasibility Study of a Plasma Display-Like Radiation Detector for X-Ray Imaging"; IEEE transactions on Applied Superconductivity; vol. 20, No. 3, pp. 269-276; Sep. 2012.

* cited by examiner

MICROCAVITY PLASMA PANEL RADIATION DETECTOR

CROSS REFERENCE TO RELATED APPLICATIONS

This application claims priority of U.S. Provisional Patent Application Ser. No. 61/796,549, filed on Nov. 14, 2012, and U.S. Provisional Patent Application Ser. No. 61/852,346, filed on Mar. 15, 2013. The contents of both provisional applications are hereby incorporated by reference.

FIELD

One embodiment of the present invention is directed to the detection of radiation. More particularly, one embodiment of the present invention is directed to a plasma panel based detection of radiation.

BACKGROUND INFORMATION

Many useful applications, such as the detection of radioactive material and computer-assisted tomography ("CAT"), rely on the detection of photon radiation, known as X-ray and/or gamma-ray radiation. Both of these types of high-energy photon radiation cause ionization and for the purposes of this disclosure the two terms, X-ray and gamma-ray, are used interchangeably. In terms of the detection of such ionizing radiation, the spectral region of greatest interest for most of these applications generally falls between the energies of about 20 keV to 20 MeV. Other applications, including the detection of particle radiation from ion beam accelerators/colliders, cosmic ray generated minimum ionizing particles ("MIP"s), and neutrons from special nuclear materials ("SNM") used in nuclear weapons (e.g., enriched uranium or plutonium-239), rely on the detection of ionizing particles that can be either atomic nuclei (e.g., alpha particles), or subatomic (e.g., neutrons, protons and muons) in nature, and which can vary over a very broad energy range from less than 1 MeV to well beyond 1 TeV.

In order to detect ionizing radiation in the above spectral range of interest, a number of known sensing devices are commonly used. One of the earliest known electronic devices is the ionization chamber. Detection of radiation in an ionization chamber, such as a Geiger-Mueller ("GM") tube, is based upon electrical conductivity induced in an inert gas (usually containing argon, neon or helium as the main component) as a consequence of ion-pair formation. One currently widely used type of ionizing-particle radiation detector is the micropattern gas detector. These devices have been under continuous development for many years in high energy and nuclear physics. Detectors such as the Microstrip Gas Chamber ("MSGC"), Gas Electron Multiplier ("GEM") and Micromegas have many desirable properties as proportional gas detectors, but are operationally limited to gains within the proportional region in the range of $\sim 10^3$ to $10^6$.

SUMMARY

One embodiment is a position-sensitive ionizing-radiation counting detector. The detector includes a first substrate and a second substrate, and a defined gas gap between the first substrate and the second substrate. The first and second substrates comprise dielectrics and a discharge gas is contained between the first and second substrate. A microcavity structure comprising microcavities is coupled to the second substrate. An anode electrode is coupled to the first substrate and a cathode electrode is coupled to the microcavity structure on the second substrate. The detector further includes pixels defined by a microcavity and an anode electrode coupled to a cathode electrode, and a resistor coupled to each of the cathode electrodes. Each pixel may output a gas discharge counting event pulse upon interaction with ionizing-radiation. The detector further includes a voltage bus coupled to each of the resistors and a power supply coupled to at least one of the electrodes. A discharge event detector is coupled to an electrode for detecting a gas discharge counting event in the electrode. The detector further includes circuitry for detecting if a gas discharge counting event pulse is output from the pixels, and for counting each such gas discharge pulse as an individual event and of equal value. The amount of detected radiation is based on a total count of individual events.

DETAILED DESCRIPTION

One embodiment is a microcavity based plasma panel sensor ("PPS") based on an internal cavity cell structure for the purpose of realizing enhanced performance when detecting ionizing radiation. Embodiments of this "microcavity"

plasma panel radiation detector or "microcavity-PPS" have relatively small internal cell cavity dimensions, typically less than 1 cm in any one direction, and for many applications on the order of a millimeter or less in at least one dimension. Embodiments can be used for the detection, tracking, identification, position sensing and/or imaging of ionizing particles, ionizing particle beams or photons generated by any means.

The particles to be detected by embodiments are numerous. Embodiments and integrated systems that incorporate embodiments can perform the detection, identification, monitoring, tracking, profiling and/or imaging of protons and heavier ions such as carbon and neon ions in the treatment of cancer by hadron particle beam therapy; the detection, identification, monitoring, tracking, profiling and/or imaging of very large and/or heavy ionizing particles such as generated in radioactive ion beam ("RIB") accelerators, and the detection, identification, and tracking of subatomic ionizing particles such as muons generated in facilities such as the Large Hadron Collider ("LHC") at CERN.

Embodiments can further detect ionizing particles or ionizing photons (e.g. ultraviolet light, X-rays, gamma rays) from radioactive sources, including the detection of neutral particles such as neutrons which upon neutron capture generate ionizing particles. Embodiments can further detect ionizing radiation for medical imaging, medical therapeutics, astronomy and space exploration, oil and gas exploration, gas-turbine flameout monitoring, nondestructive testing, nuclear and high energy physics, etc., or any other type of ionizing radiation for any needed application.

Embodiments utilize structure and material from prior art plasma display panels ("PDPs") for some of its components. PDP's are the core component of many flat panel display products including flat panel plasma televisions. Their design and production is supported by an extensive and experienced industrial base with over four decades of development. A PDP television comprises millions of cells per square meter, each of which, when provided with a signal pulse, can initiate and sustain a plasma discharge.

Figure 1:
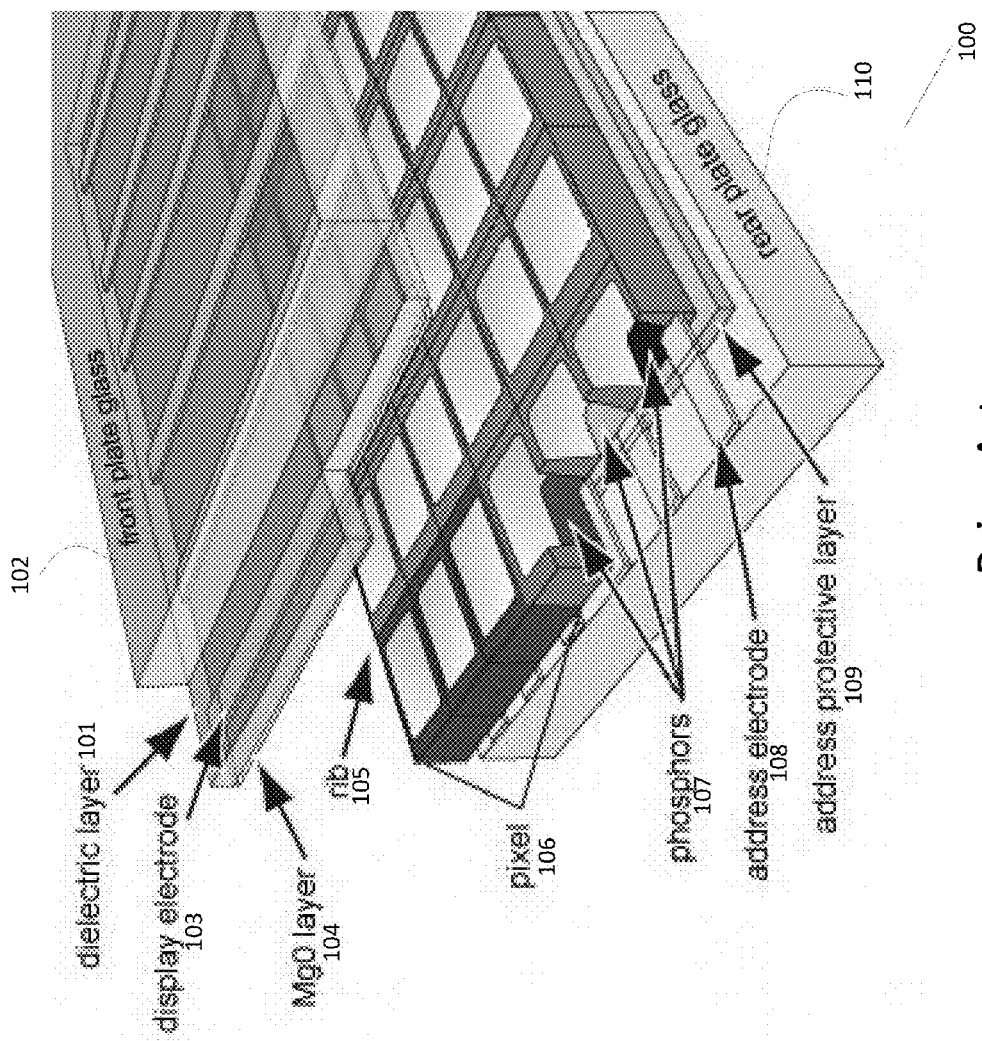
FIG. 1 is a perspective view of an example prior art PDP that is typical of available PDPs used for television or other display purposes.

FIG. 1 is a perspective view of an example prior art PDP 100 that is typical of available PDPs used for television or other display purposes. PDP 100 includes arrays of electrodes, including display electrodes 103 and address electrodes 108 deposited on glass substrates, and separated by a gas gap between a front plate glass 102 and a rear plate glass 110. The electrode plus gap configuration constitutes a cell with three different phosphor cells 107 (e.g., red, green and blue) making/forming/defining a pixel 106. Further included between glass plates 102 and 110 is a dielectric layer 101, an MgO layer 104, ribs 105, phosphors 107 and an address protective layer 109.

Commercial PDPs, such as PDP 100, are comprised of millions of cells per square meter, each of which can initiate and sustain a localized plasma discharge almost indefinitely at a typical "on" rate of 20 to 50 kHz. PDPs have been produced as both DC-type (direct current) and AC-type (alternating current) units. Discharge termination in a DC-type PDP is aided by a quench resistor, while AC-type units exploit the gap field reversal produced within dielectric layers deposited over the discharge electrodes. In a typical PDP such as shown in FIG. 1 (i.e., an AC-type surface-discharge PDP for a television), the discharge gap is formed between two "display" electrodes on the front substrate. The pixel or cell contains a phosphor coated wall structure enclosing a plasma discharge region.

Radiation detectors based on a PDP such as PDP 100 are disclosed, for example, in U.S. Pat. No. 7,332,726, and U.S. Pat. Pub. No. 2010/0265078, the disclosure of each of which is hereby incorporated by reference. These detectors, which can have significantly higher gain, can be considered a hybrid device that encompasses some of the best features of Geiger-Mueller ("GM") tubes and conventional micropattern gas detectors. They provide both high performance and very low cost.

Figure 2:
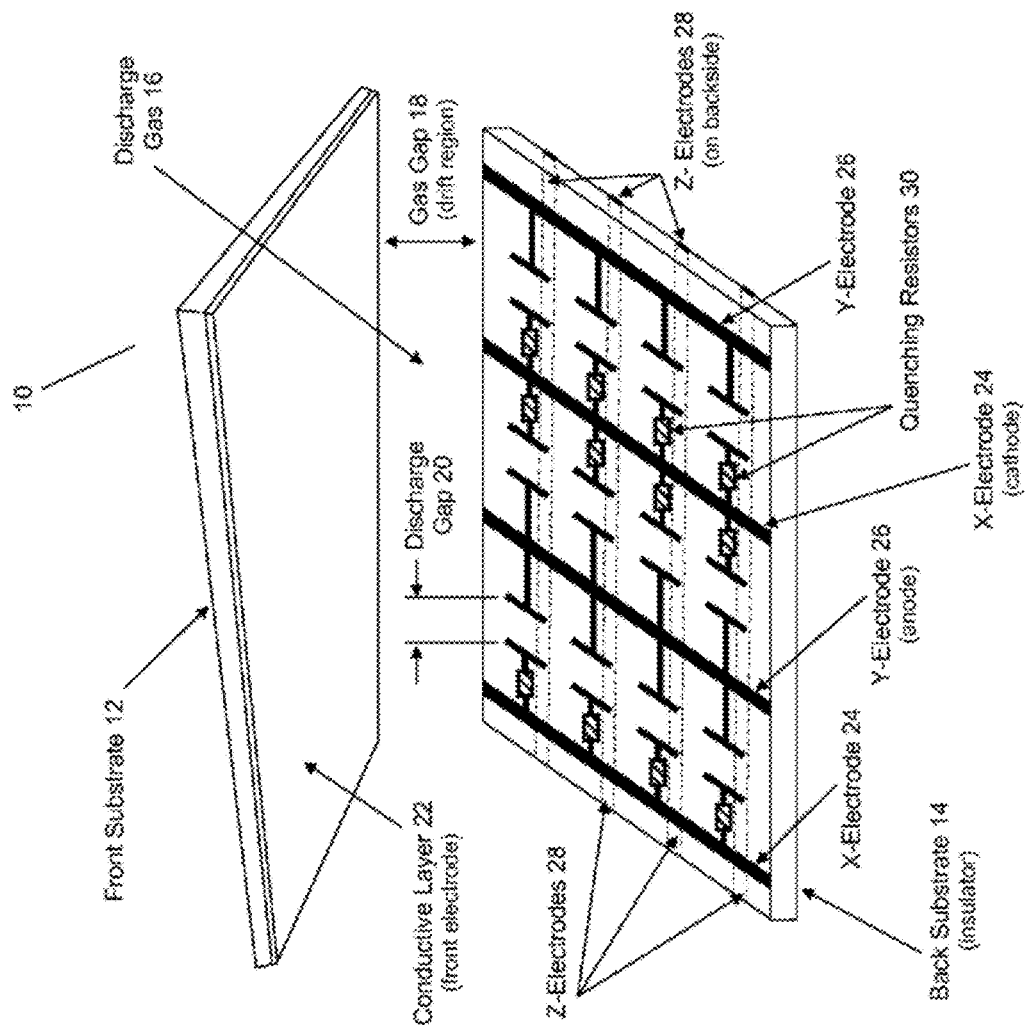
FIG. 2 is a perspective view of a prior art surface-discharge PPS with a parallel/rectilinear surface-discharge electrode pattern incorporating individual cell quenching resistors and an orthogonal back electrode pattern.

FIG. 2 is a perspective view of a prior art surface-discharge PPS 10 with a parallel/rectilinear surface-discharge electrode pattern incorporating individual cell quenching resistors and an orthogonal back electrode pattern. PPS 10 includes a first (front) substrate 12 and a second (back) substrate 14, separated by a gas filled gap 18. Sensor 10 includes X-surface discharge electrodes (cathode) 24 and Y-surface discharge electrodes (anode) 26. Detector 10 further includes Z electrodes 28 on the backside of the back substrate 14, quenching resistors 30, and a front conductive layer 22.

PPS 10 is based on surface-discharge, 4-electrode configuration in which the front conductive layer 22 can serve as a front electrode or drift electrode which can also be a thin metal coating. In another embodiment, the front conductive layer can also be a conversion layer or thin sheet such as gadolinium (Gd) foil that can capture a neutral ionizing particle such as a thermal neutron and then emit a fast conversion electron (e.g., 72 keV) into the discharge gas 16. For many applications the PPS front conductive layer 22 can be combined with the front substrate 12 by making the front substrate a metal plate or metal foil. For detector 10, the gas gap is also known as the "drift region" for the discharge gas that fills the region between the front substrate 12 and the back substrate 14.

PPS 10 in one embodiment is a highly integrated array with roughly $10^2$ to $10^6$ micro-detection cells per $cm^2$, each of which can act as an independent, position-sensitive, radiation sensor. PPS embodiments, in general, efficiently collect free-electrons and ions created in a gas by the passage of an ionizing particle and then, via the drift field, "channel" the electrons and ions into the higher field region where an avalanche develops leading to breakdown.

The microcavity-PPS in accordance with one embodiment uses a discharge gas that fills the discharge-gap which defines an orthogonal ion-pair creation drift region of the PPS pixel array 10 of FIG. 2. The electrode configuration of the discharge pixel is defined by a local electrode arrangement forming a capacitive discharge gap coupled to an embedded resistor in the high voltage feed lines. The resistance reduces the electric field during discharge and terminates the pulse.

Embodiments incorporate/utilize the following attributes that are present in plasma television display panels: (1) pixels are defined by optically, physically and electrically isolated cavities established around the crossing points of electrodes; (2) pixels can be close packed assuring high coverage (i.e., high fill-factor); (3) the gas envelope can be formed by thin, low mass and inexpensive substrate materials such as glass, ceramic, foil or even inorganic coated plastics; (4) cavity geometry can be optimized for efficiency and discharge voltage; (5) fabrication utilizes well established processes in the production of flat panel displays and other highly integrated substrate based products such as multi-chip modules ("MOM"); (6) a hard, sputter resistant cathode surface area is very resistant to ion damage: AC-PDPs typically use an MgO layer for this purpose, however embodiments include a hard, sputter and corrosion resistant, high temperature or refractory type metal such as Ni, Cr, Ti, W, Zr, Pt, Ir, Ti—W, etc., or a conductive or even semi-conductive non-metal.

Figure 3A:
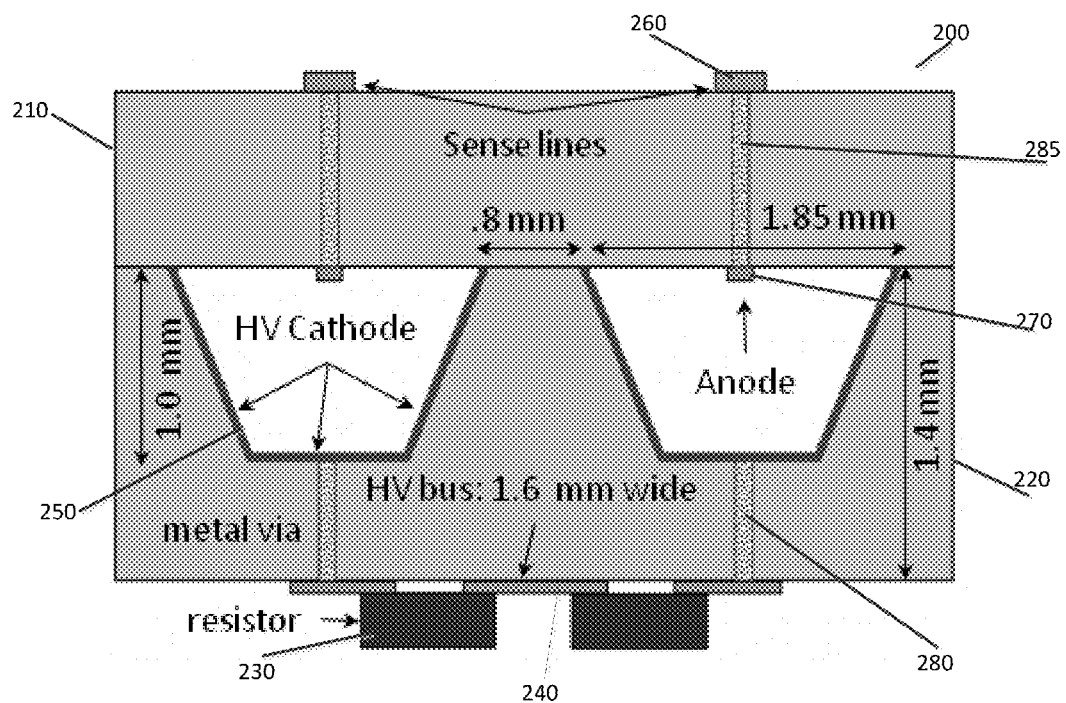
FIG. 3a illustrates a two-dimensional cross-sectional view of one embodiment of a low resolution microcavity-PPS in accordance with one embodiment with some example dimensions.

The microcavity-PPS in accordance with one embodiment differs from other PDP based radiation detectors at least due to the construction and operation of the PDP cell cavity. FIG. 3a is a cross-sectional view of one embodiment of this structure, showing two adjacent microcavity pixels. Chains of successive, isolated cavities, with quench resistors 230 bridging the high voltage ("HV") bus 240 to the cathode 250 establish independent readout sites along one coordinate (e.g., the X-line) on the rear substrate 220. Parallel chains of sense lines 260 that connect to anodes 270 through a conductive via plug 285 provide an orthogonal coordinate (Y-line) readout on the front substrate 210.

Embodiments incorporate a microcavity-PPS with sensitive cells (or pixels) defined by metallized surfaces in dielectric cavities. As discussed, FIG. 3a illustrates a two-dimensional cross-sectional view of one embodiment of a low resolution microcavity-PPS 200 in accordance with one embodiment with some example dimensions. Surface mount resistors 230 bridge each pixel cathode 250 to a high voltage (HV) bus 240. A cover or top substrate 210, and a microcavity structured back or rear substrate 220 can be fabricated by a variety of PDP thick film manufacturing techniques or laser or mechanically machined from an ultra-low outgas alumina or engineering glass-ceramic material. In other embodiments, the isolation resistors 230 can be implemented with thick-film printed resistors instead of discrete surface mounted resistors. In another embodiment the conductive (metal) via plug 280 on the rear substrate 220 is replaced with a thick-film printed resistive via plug that serves as the quench resistor thereby eliminating the need for the discrete resistor 230.

Figure 3B:
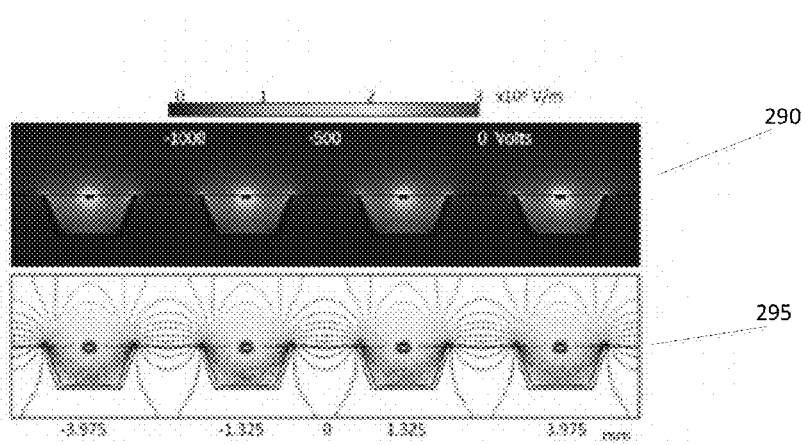
FIG. 3b illustrates a perspective view modeling a microcavity-PPS in accordance to one embodiment.

FIG. 3b illustrates a perspective view modeling microcavity-PPS 200 in accordance to one embodiment. The modeling shown in FIG. 3b was generated using a "COMSOL Multiphysics" finite element analysis/solver modeling of a design for 1 KV applied voltage. An electric field is shown in section 290 and equipotential contours are shown in section 295.

Figure 4:
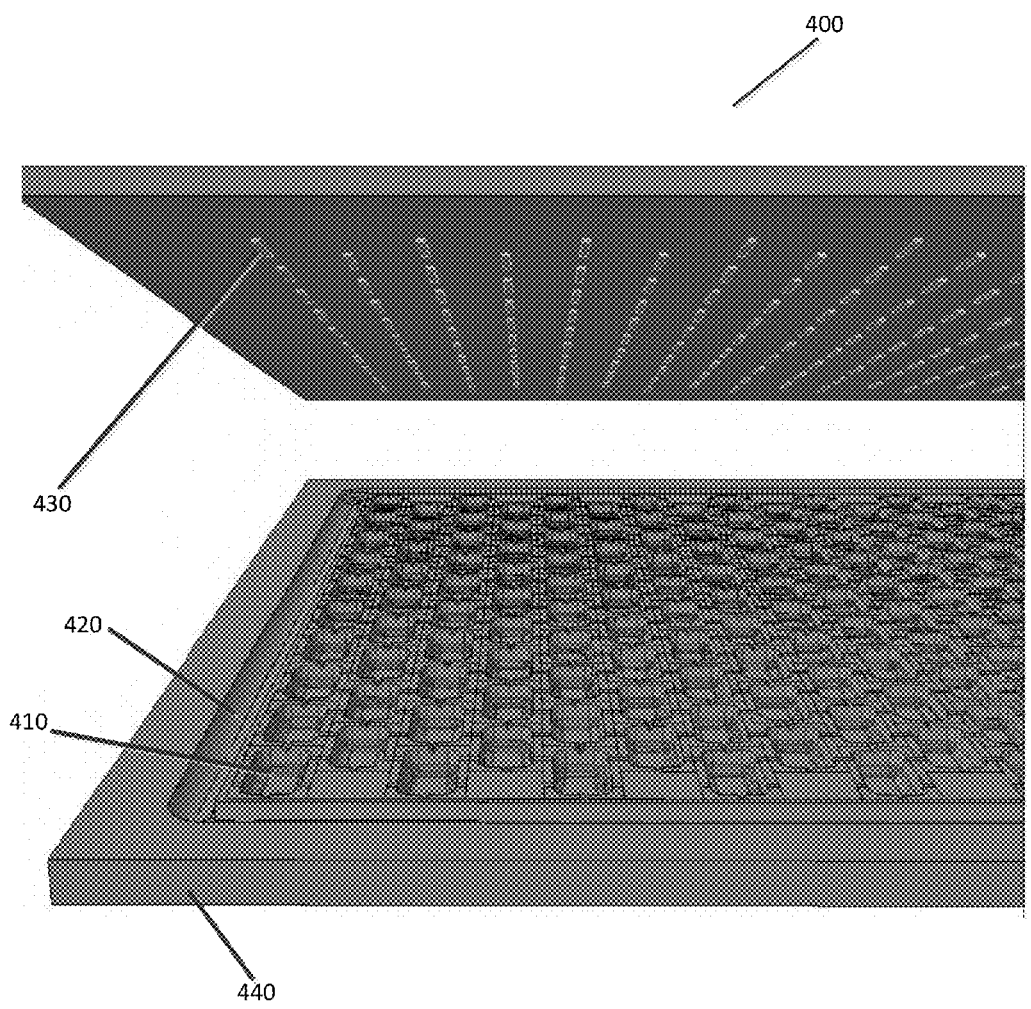
FIG. 4 illustrates a three dimensional perspective view of an array of micro-plasma cavities in accordance with one embodiment.

FIG. 4 illustrates a three dimensional perspective view of an array of micro-plasma cavities 400 in accordance with one embodiment. FIG. 4 illustrates a cathode metallized inner surface of each cavity 410 located on the back or rear substrate 440, that is connected to a high voltage ("HV") bus with a resistor on the bottom of the rear substrate as shown in FIG. 3a. Gas flow notches are shown that lead to a perimeter gas flow channel 420. The anodes 270 and 430 on the inside surface (i.e., facing the gas) of the top (or front) substrate as shown respectively in FIGS. 3a and 4, are at or near ground potential, and connect to Y-coordinate readout electrodes through a conductive via plug 285 on the front substrate (i.e., sense lines in FIG. 3a). Monitoring of the voltage drop on the HV lines, either directly or through or capacitive coupling, delivers the X-coordinate signal (XY ambiguities can be resolved with fast signal time stamps or by capacitive coupling to the X-lines by an external, air-gapped orthogonal Z-line).

Figure 5:
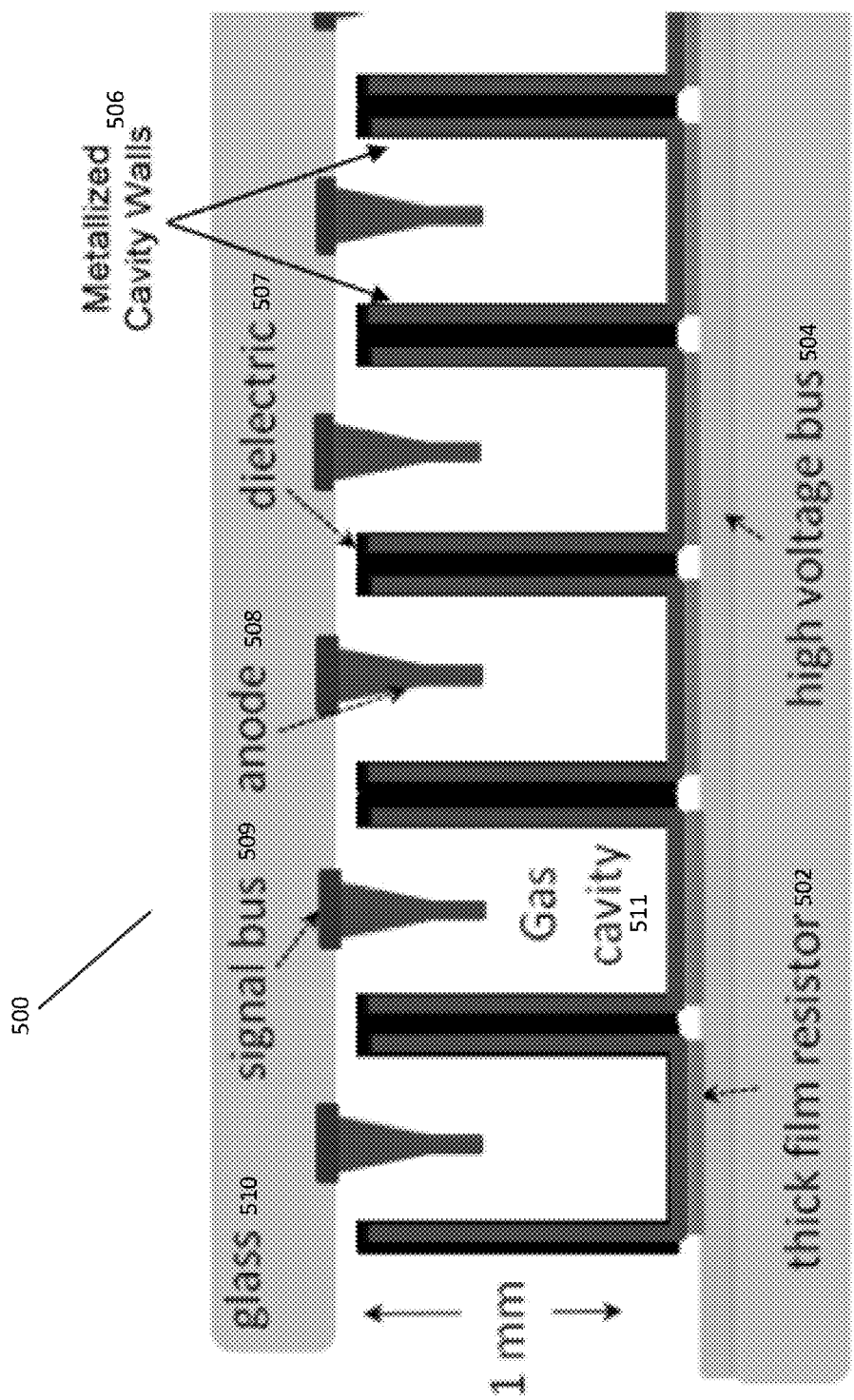
FIG. 5 illustrates a side view of a microcavity-PPS cavity array in accordance with another embodiment.

FIG. 5 illustrates a side view of a microcavity-PPS cavity array 500 in accordance with another embodiment. Metallized inner walls 506 over a dielectric 507 are connected to a high voltage ("HV") bus (X coordinate) 504 via printed resistors 502. Anodes 508 protrude into the cavity 511. Signal lines 509 convey a Y coordinate readout. Array 500 couples the metallized inner cavity cathode surface to the HV bus with resistive paste thick-film patterned depositions.

The bottom barrier or cavity structure can be produced by successive printings of dielectric layers which can be patterned by chemical etching or sandblasting of the "green" dielectric, or by numerous other known means, creating the cavities down to the resistor layers. Metallization can be done by electron beam deposition or ion beam sputtering over a photoresist mask or stencil mask to protect the top walls of the barriers from metallization. The top substrate structure featuring conductive anode electrodes protruding into the cavity can be produced in a similar fashion or by other means and can be fabricated from glass (510) or ceramic or from an inorganic coated polymer. The bottom substrate can also be fabricated from glass or ceramic or from an inorganic coated polymer.

Figure 6:
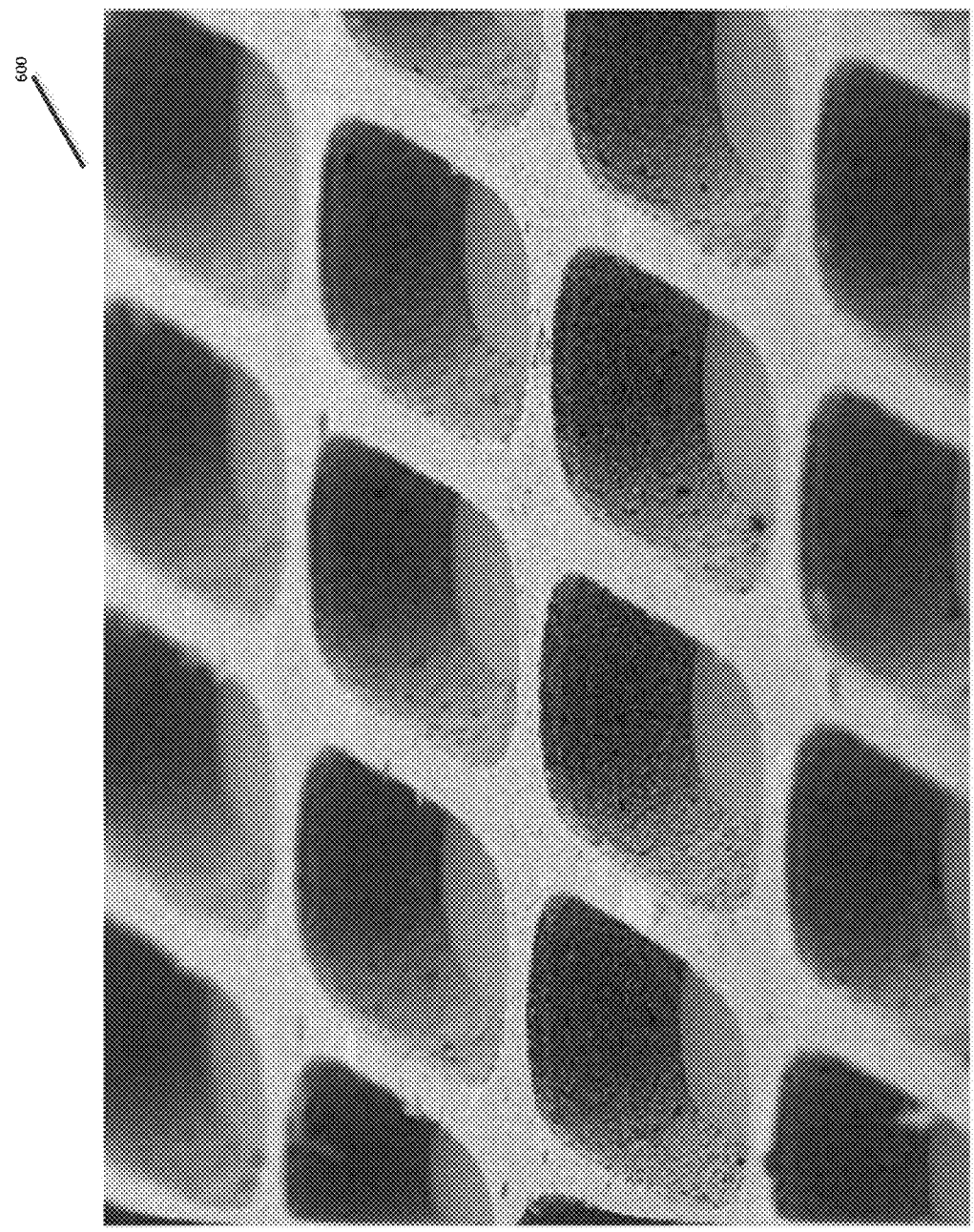
FIG. 6 illustrates a magnified view of a fabricated microcavity array that can be produced by sandblasting or chemical etching processes commonly used in PDP fabrication in accordance with one embodiment.

FIG. 6 illustrates a magnified view of a fabricated microcavity array 600 that can be produced by sandblasting or chemical etching processes commonly used in PDP fabrication in accordance with one embodiment. The scale of each individual cavity is approximately 100 microns. Cavity array 600 can be fabricated into a cathode microcavity-PPS structure by using a PDP barrier rib plus patterned thin-film or thick-film metallization to create the cavity electrode layer. Other means of fabricating the cavity can also be used such as mechanical milling, or molding, or press patterning of the cavity in a ceramic material in its soft, pliable, "green" state prior to firing.

As described, embodiments are configured as a microcavity-PPS. Further, each cell functions like an independent counter radiation detector unit. The microcavity-PPS radiation detector thus operates as an array of parallel pixel-sensor-elements or cells, each independently capable of detecting charged particles generated within the cell by incident ionizing radiation. Each cell in the microcavity-PPS is biased to discharge when free-electrons or ions are generated in the gas by ionizing radiation. The cell discharge process is spatially self-contained inside the cell volume and terminated by various means, including adding a localized impedance in each cell or on each high voltage (cathode) line as shown in FIGS. 3a and 5 (and FIG. 13 below).

The total charge available to produce a pulse signal is that stored by the internal capacitance and determines an effective gain that is dependent upon the pixel structure and materials. Since the cell is operated above the proportional mode, it can be thought of as micro-Geiger counter. The signal pulse will thus be independent of the number of initiating charged particles, rendering the PPS intrinsically digital. The large gain in embodiments of PPS devices is generally sufficient to eliminate the need for signal amplification electronics. In these devices the discharge current of an individual triggered cell is unimportant, only that a cell is either "on" or "off", which for fast-timing applications means being able to detect the rise time of the discharge with low jitter. Because of the isolated microcavity cell structure, crosstalk and discharge spreading is minimized if not eliminated, thereby enhancing the device capability as a high resolution, position-sensitive radiation detector. For particle counting and radiation dosimetry applications, the microcavity-PPS provides a highly linear, accurate, and quantitative digital response to an amount of incident radiation based on a total count of individual events.

Embodiments function as an improved high resolution, fast response, high gain and inherently digital radiation detector. Embodiments inherit from PDPs several key attributes attractive for ionizing radiation detectors. Like PDP's, the microcavity-PPS can be fabricated from intrinsically rad-hard materials and hermetically sealed with a non-aging and non-reactive gas mixture, thus resulting in a device with extensive lifetime. In one embodiment it includes a dense array of micro-Geiger discharge cells of an order of hundreds of microns in dimensions. Embodiments of the microcavity-PPS detectors can be used in a host of applications requiring fast detection of minimum ionizing particles ("MIP"s), and, with an appropriate front-panel detector interface (e.g. scintillator+ photocathode), high energy photons and neutral particles detection.

Low manufacturing costs of large scale flat plasma panel televisions mean that large scale, high resolution, microcavity-PPS detectors tapping into a similar industrial infrastructure and materials can also be produced inexpensively. The potential virtues of PPS detectors can lead to applications currently satisfied by drift tube detectors, resistive plate chambers, cathode-strip chambers, microstrip gas counters, and other variants of gaseous proportional counters and micropattern detectors used in high energy physics ("HEP") or nuclear physics ("NP").

Costs of PDP television production have been dropping year by year. The design, components and manufacture of embodiments of microcavity-PPS detectors are intended to have maximal overlap with PDPs. They can incorporate the same or similar types of glass as well as other suitable substrate materials, a variety of sputter resistant electrode materials, Penning gas mixtures, and panel thick-film and thin-film fabrication and sealing processes.

Embodiments of the disclosed microcavity-PPS can be classified as a type of micropattern, gas-filled detector, related to Micro-Strip chambers and Micromegas. The special attributes and unexpected results that distinguish embodiments of the present invention from known detectors include:

(1) Sparking and gain: A recurrent problem with micropattern detectors which operate with gains of $\sim 10^4$ (and greater) is possible destructive sparking. The microcavity-PPS is designed to typically be a higher gain, Geiger-mode device and, intrinsically, spark-free. An inline current-limiting quench resistor associated with every microcavity-PPS pixel, or pixel high-voltage cathode line, immediately drops the voltage at discharge and terminates the current pulse.

(2) Longevity and radiation hardness: microcavity-PPS materials that form PDP television displays are glass, nonreactive refractory/metal electrodes, and inert or non-corrosive gas mixtures. They contain no thin-film polymeric or plastic surfaces used in other micropattern detectors in the gas discharge region, and no hydrocarbons that can degrade or outgas. All microcavity-PPS materials are selected for radiation hardness. The device lifetime should exceed Micromegas and gas electron multiplier ("GEM") type detectors which require an expensive gas flushing system to remove contaminants. This conclusion is based on known problems associated with the reactivity of hydrocarbons and polymeric materials in "energetic" plasma discharge environments, which typically lead to the formation of chemically active free-radical and ionic gaseous species that can generate new contaminating species that fundamentally degrade device performance.

(3) Hermetic gas containment: microcavity-PPS envelopes can be fabricated using the same industrial processes and hermetic glass seal materials used for PDPs. The panel substrates are typically impermeable to atmospheric gases, or can be engineered or configured to be so. Proven PDP lifetimes exceed $10^5$ hours.

(4) Spatial resolution: Mature photolithographic techniques can be used to deposit and pattern electrodes with micron-level precision and with cell pitches that can be as fine as $\sim 50$ to 100 µm; current manufacturing capability already far exceeds this precision thus providing a direct path to high resolution microcavity-PPS devices.

(5) Fast response and high rates: Signal development depends on gas avalanche and streamer formation over a narrow gap. These processes are intrinsically fast, on the order of nanoseconds or sub-nanoseconds. Rate capability is determined by the cell recovery time. In tests using commercial PDPs with large capacitances, recovery times are $\sim 10$ µs. In the microcavity-PPS cell, capacitances can be orders of magnitude smaller with recovery times expected to be less than 1 µsec. Further, AC-PDPs designed as sunlight readable cockpit displays have been successfully operated at frequencies of 1 MHz with cell recovery times of less than 1 µs. With pixel densities from hundreds to thousands of cells/cm$^2$, the hit rate capability can be $\sim 100$ MHz/cm$^2$.

(6) Cost and scalability: Microcavity-PPS detectors can benefit from similar fabrication processes and materials as large area PDPs. Currently, large size PDP display units exceeding 100 inch diagonal are commercially available. Current retail market prices of PDPs are less than $0.20 per square inch. Microcavity-PPS readout electronics would be similar to those used in other high channel density, two coordinate detectors. The expected high gain of a microcavity-PPS renders them intrinsically binary, possibly obviating an amplification stage and thus simplifying the front-end signal processing. Also because they are fabricated with inorganic substrate materials, high density, high speed electrode to IC interconnections can be achieved via low cost, chip-on-glass ("COG") or chip-on-flex-circuit type technology such as used with PDPs and LCDs.

As discussed, the manufacture of a microcavity-PPS device in accordance with embodiments employs many similar processes used for the production of LCD and PDP flat panel displays. The primary structural components include inorganic substrates (e.g., glass or ceramic), dielectric window frameworks and barriers (e.g., glass or ceramic), electrode depositions, gas filling and hermetic envelope sealing. One embodiment is a low capacitance DC device with "bare" electrodes as anode and cathode. This allows diminutive line widths and pitches. The line width uniformity can be achieved for example by an ion-milling etch process, and such processes can be used for $\sim 100$ µm pitch microcavity-PPS anodes.

The materials requirements for various embodiments are determined primarily by radiation hardness and aging resistance. Materials intended for use are intrinsically non-degrading with exposure to UV/VUV photons, ionizing radiation, and ion bombardment at the cathode surface. Microcavity-PPS devices, like PDPs, incorporate inert, non-reactive and sputter resistant components. Examples of the following three materials for embodiments of the present invention are as follows:

(1) Substrate: The substrate is comprised of very low gas permeability display panel glass although ceramic substrates such as alumina or engineering glass-ceramics are also suitable. An example is Corning Eagle-XG Slim™ Display Glass, commercially available in meter sizes and larger and in thicknesses from $\sim 0.2$ mm to 1.1 mm. A muon tracker detector can thus have a low mass profile: A four layer flat panel tracking detector, similar to the number of tracking layers in the ATLAS Muon Spectrometer fabricated with a total front and back substrate thickness of 400 µm has negligible multiple Coulomb scattering to $\sim 100$ GeV muons.

(2) Metal Electrodes: the metal electrodes are subject to continuous ion bombardment and should be composed of sputter resistant, refractory type materials. One indicator of the strength of the metallic bond to resist ion sputtering is the melting and boiling point temperature: Choices for an electrode material include: Ni, Cr, Ti, Pt, Zr, Ir, W, Ti—W, etc.

(3) Gas Fill: PDPs are hermetically-sealed with demonstrated remarkably long lifetimes: Units sold in the 1970's and operating continuously (24/7) are still functioning today, 35 years later. This leads to a design objective of microcavity-PPS detectors: the gas remains sealed inside the envelope without the need for an external gas system, although this is not an absolute necessity for every application. Mitigation of excited state species (e.g., photons, ions, free-electrons, metastables) causing secondary discharges in neighboring cells is achieved primarily by the physical microcavity enclosure itself, but some quenching agents can also be employed. The microcavity-PPS gas mixture, like that of PDPs, should ideally be a mono-atomic noble host gas (e.g., He, Ne, Ar, Kr or Xe) with another noble gas, or a stable molecular gas. The choice of gas mixture may also be dictated in part by the need to minimize internal sources of free-electrons that might collect on the wall surfaces. However the metallized cavity design all but eliminates the vast majority of such surfaces. In some embodiments a method demonstrated to inhibit unwanted free-electrons can be employed to minimize the number of gas-phase metastables, reducing lifetimes of gaseous excited state species. This involves the addition of a suitable Penning gas dopant with good electron affinity, a large electron capture cross-section, and VUV absorption. Dopants could include: Xe, $CO_2$, $N_2$, $CF_4$, $SF_6$, etc. Hydrocarbons such as $C_2H_6$, $C_3H_8$, i-$C_4H_{10}$, etc. are unsuitable as their decomposition would be problematic, especially in a hermetically sealed device.

In one embodiment, all of the microcavity-PPS manufacturing steps in accordance to one embodiment can involve fully-mature processes that can achieve the high uniformity required to realize the high yields required for a 50" PDP that can be purchased today for less than $0.20 per sq. inch as the major component of a high-definition "plasma" television set ("HDTV") that sells for about $500. The scaling up of the fabrication processes on ever larger glass substrates provides an excellent example of how mature the manufacturing processes have become, and how impressive the uniformity must be. Today as many as 16 individual 42" diagonal PDPs are fabricated (by Panasonic) on a single glass "super-substrate". Although embodiments of the microcavity-PPS devices should involve a somewhat simplified fabrication process compared to a PDP, the low manufacturing volume will make the devices more expensive. Further, since embodiments of the microcavity-PPS radiation detector are not a TV panel, a number of manufacturing steps can be eliminated such as the sequential phosphor patterning (i.e., red, green, blue), dielectric overcoat, internal contrast filters, and thin-film MgO secondary emitter coating. However, even at an order-of-magnitude higher cost to allow for the lower volume, the microcavity-PPS should still cost only a few dollars per square inch to produce (excluding readout electronics).

Regarding discharge spreading, plasma discharges can spread to regions beyond the original or incident hit cell location where the gas discharge was first initiated. In addition to ions and electrons, the discharge also produces metastable species and VUV photons, both of which can propagate to other regions of the panel where metastable excitation and photoelectric ejection or direct ionization of the gas can occur. Embodiments overcome this problem by enclosing each discharge cell site in a physically, optically and electrically isolated cavity (i.e., the "microcavity").

Regarding gain and power consumption, the pixel light intensity per cell discharge in a PDP TV-set and the power consumption in a microcavity-PPS radiation detector in accordance with one embodiment are a direct function of the number of charge carriers that make up the gas discharge, which in turn determines the pixel discharge current. This relationship is determined by the cell capacitance, which is estimated for one such microcavity-PPS embodiment to be on the order of about $10^{-14}$ F. For an estimated bias voltage of 500 V, the stored charge, Q=CV, is ~5 pC. The effective gain, g, is set by the amount of released charge (~½ the stored charge) or ~2.5 pC, so g≈$1.5 \times 10^7$. To estimate power consumption, a microcavity pixel density of $10^4$ cm$^{-2}$ is assumed. The energy released is ~½ $CV^2$ or ~1 nJ/event. Assuming a hit rate in the high radiation Super-LHC environment of 5 kHz/cm$^2$, with an added four-fold safety (i.e., 20 kHz), the power dissipation is ~20 µW/cm$^2$.

Figure 7:
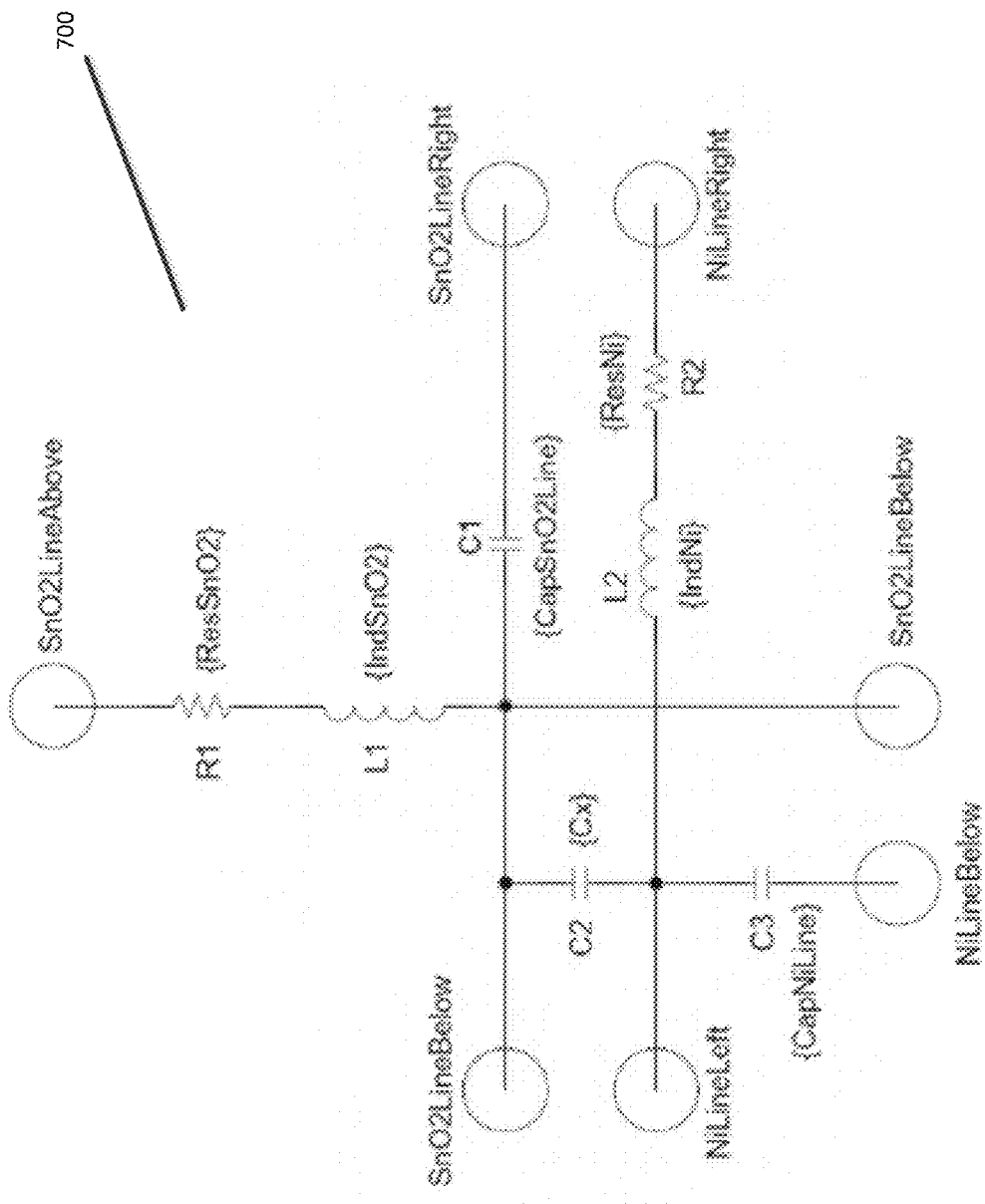
FIG. 7 illustrates a single cell schematic showing pixel discharge capacitance and associated circuit elements in accordance with one embodiment.
Figure 8:
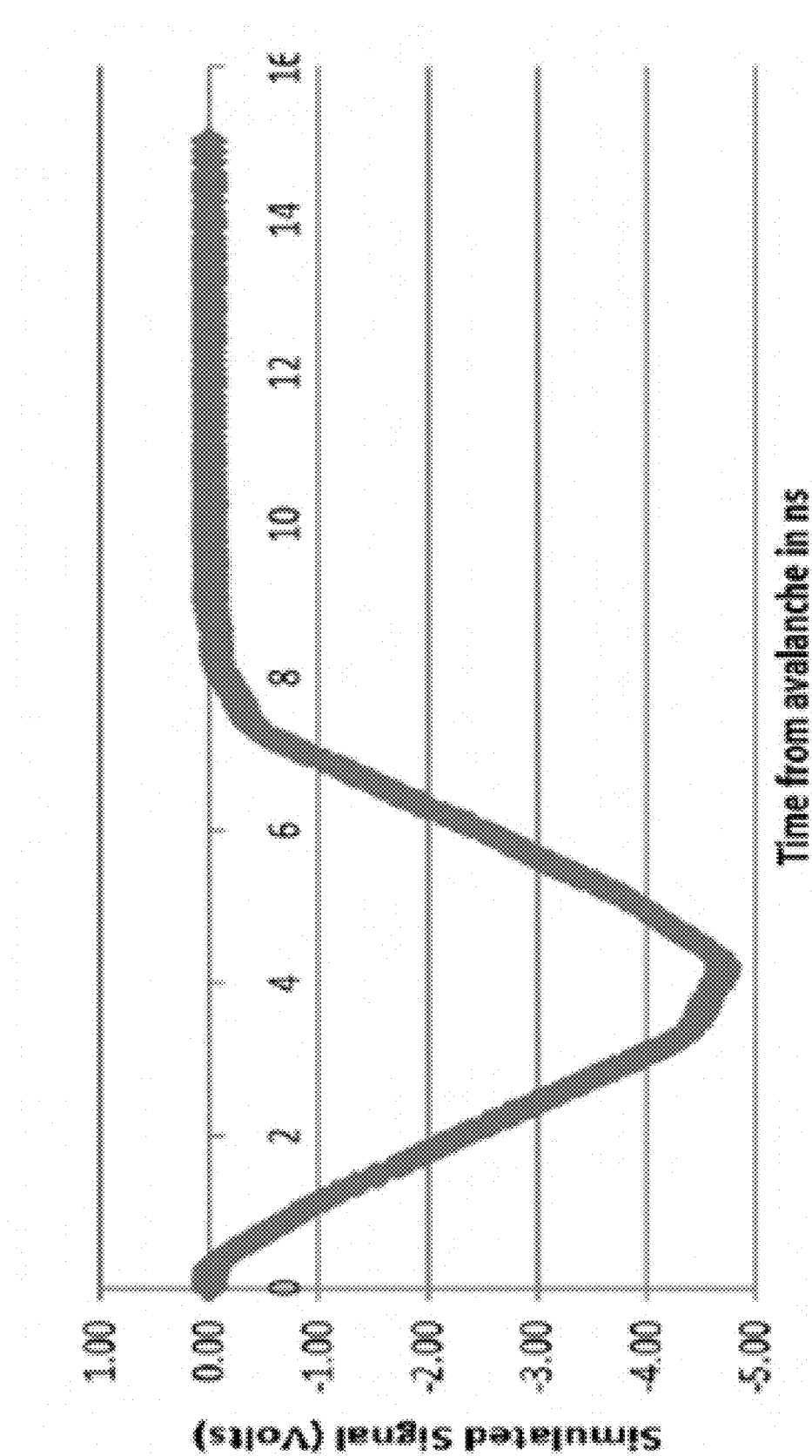
FIG. 8 illustrates an example of an output pulse from a pixel discharge in a SPICE simulation in accordance with one embodiment.
Figure 9:
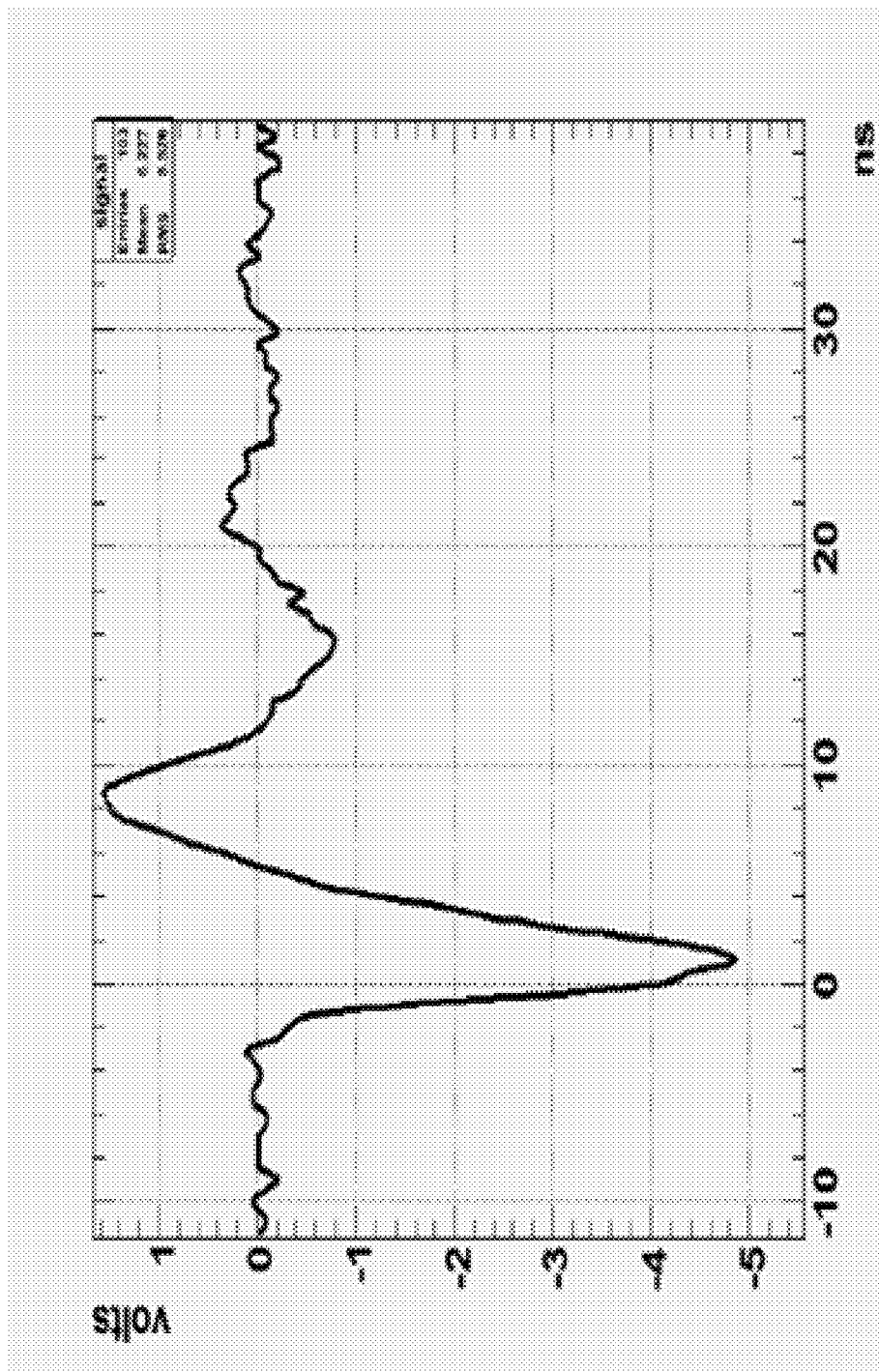
FIG. 9 illustrates a characteristic PPS signal induced by a beta source observed on a commercially available PDP filled with 600 Torr Xe.

Numerous software packages have been used to model signals in embodiments of the present invention, such as "Maxwell-2D" to model electrodes, and "3D COMSOL", which generates electric fields, equipotential surfaces and electrode capacitances and signal development. "SPICE" allows detailed electronic modeling of each cell, and capacitive and inductive couplings to adjacent cells. Drift times associated with electron transport and signal shape are modeled with "Garfield", coupled to "Magboltz" and "Heed". FIG. 7 illustrates a single cell schematic 700 showing pixel discharge capacitance and associated circuit elements in accordance with one embodiment. An array of such cells can be woven together to generate a SPICE simulation model. FIG. 8 illustrates an example of an output pulse from a pixel discharge in a SPICE simulation in accordance with one embodiment. FIG. 9 illustrates a characteristic PPS signal induced by a beta source observed on a commercially available PDP filled with 600 Torr Xe. Note the large amplitude volts level signal and ns level rise time. Also note that the SPICE simulation in FIG. 8 correlates very well with the measured signal in FIG. 9.

Figure 10:
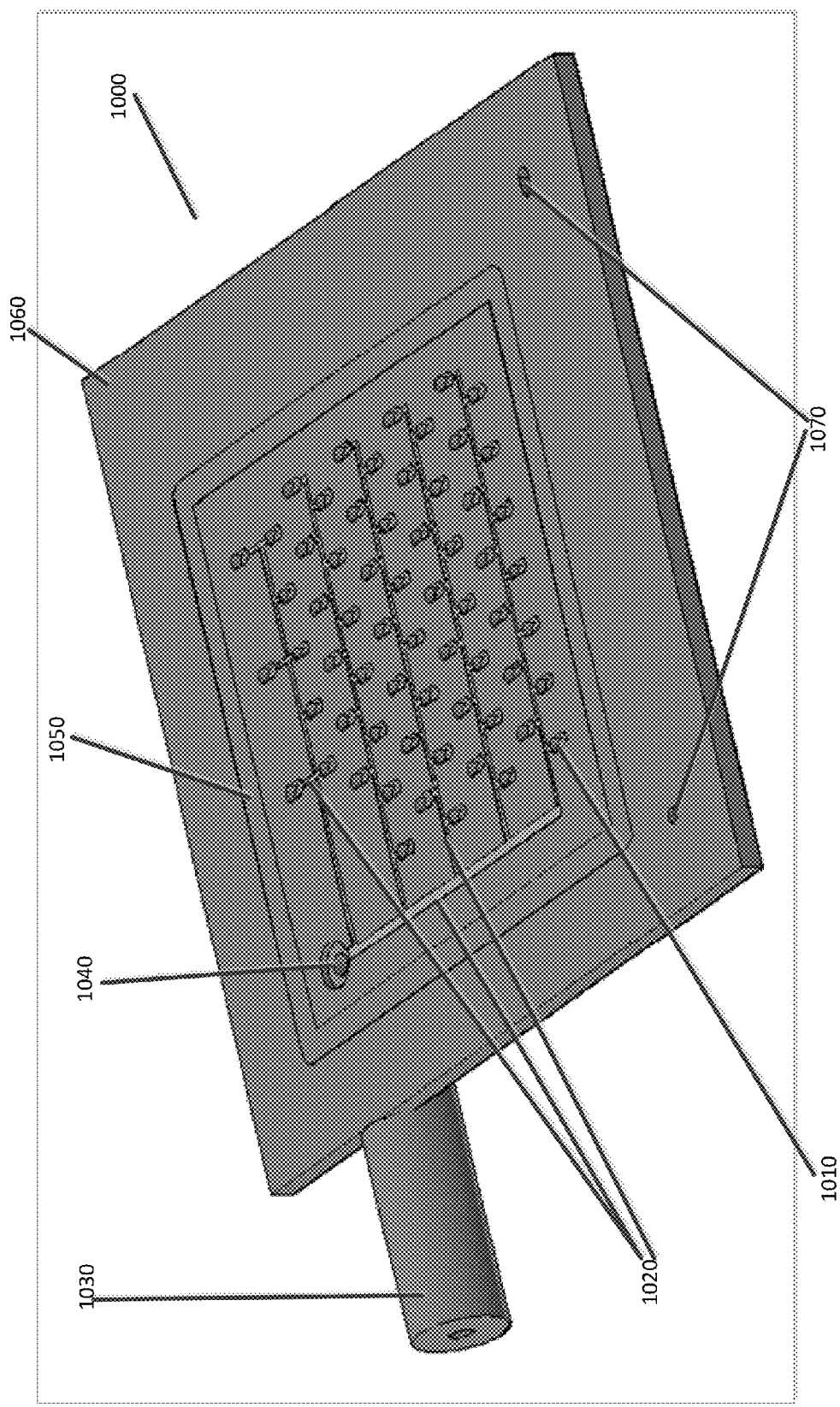
FIG. 10 is a perspective view of a microcavity-PPS in accordance to one embodiment.
Figure 11:
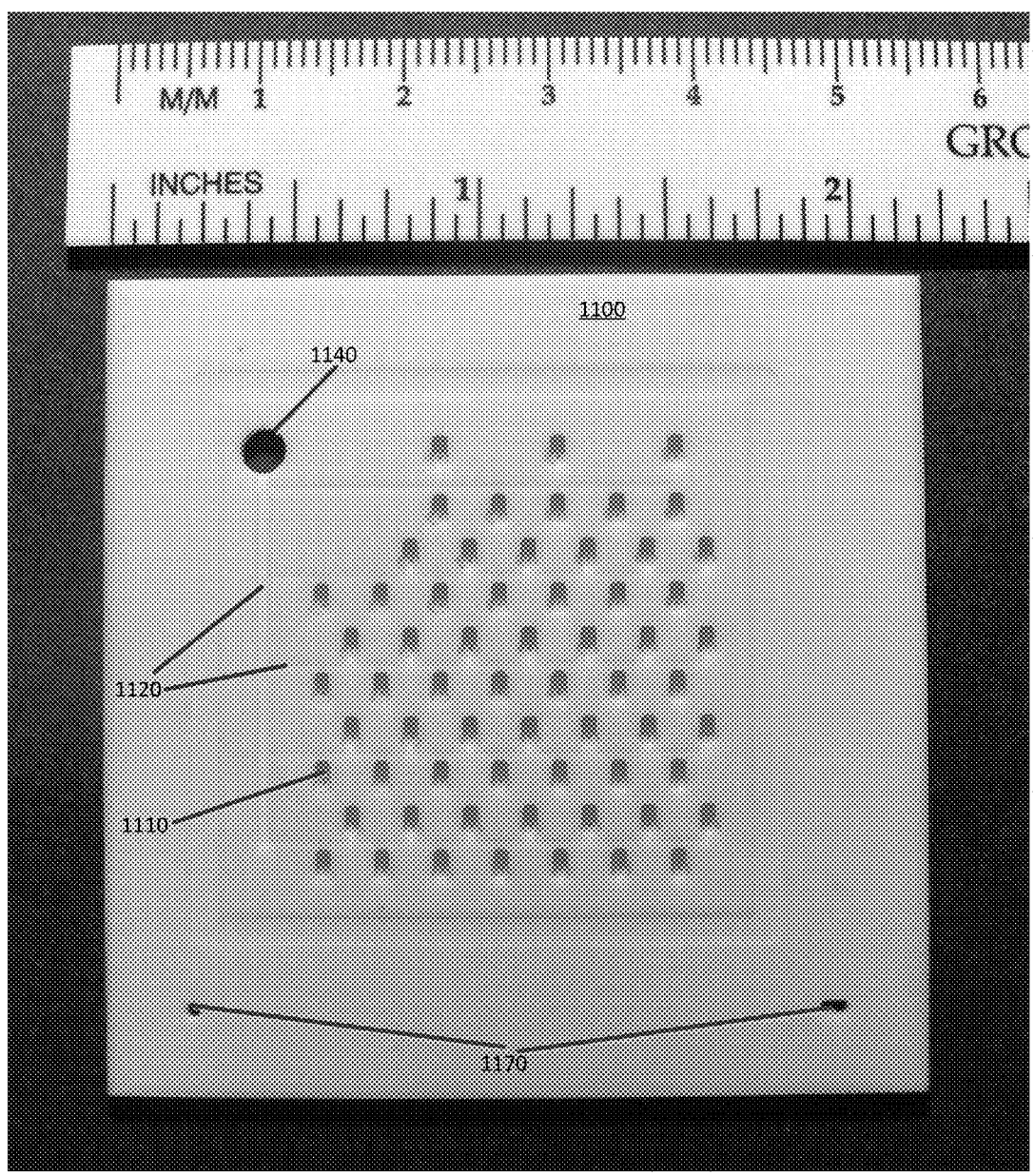
FIG. 11 is a photographic view of a fabricated microcavity-PPS back plate of the microcavity-PPS of FIG. 10 in accordance with one embodiment.

As described, embodiments of the microcavity-PPS are formed of the substrate and cavity wall materials (e.g., glass or ceramic), the patterned electrode surfaces including the conductive cavity walls (e.g., cathode) as shown in FIGS. 3a, 4 and 5, optional additional dielectric material and/or spacers, and the gas mixture that fills the gap between the two substrates, with the two substrates sealed along the perimeter to form the panel. In most cases of the embodiments described herein, the substrates are fabricated from dielectric materials. In some embodiments, the sealing can be implemented via a substrate seal groove, as shown in FIGS. 10 and 11. FIG. 10 is a perspective view of a microcavity-PPS 1000 in accordance to one embodiment. Microcavity-PPS 1000 includes a back substrate 1060, discharge cavities 1010 with connecting gas evacuation and gas fill channels 1020, gas tube hole 1040 and gas fill tube 1030, along with a hermetic seal groove 1050, and alignment holes 1070.

FIG. 11 is a photographic view of a fabricated microcavity-PPS back plate 1100 of the microcavity-PPS 1000 of FIG. 10 in accordance with one embodiment. In addition to the discharge cavities 1110 with connecting gas evacuation and gas fill channels 1120, gas tube hole 1140, hermetic seal groove 1150 and alignment holes 1170, a small conductive via plug can be seen as a "dot" near the bottom of each cavity. This via plug, like the via plug 280 shown in FIG. 3a, electrically connects the cavity cathode on the top side of the rear substrate to a quench resistor located on the substrate back side as shown in FIG. 13 below (and also as resistor 230 in FIG. 3a).

Figure 12:
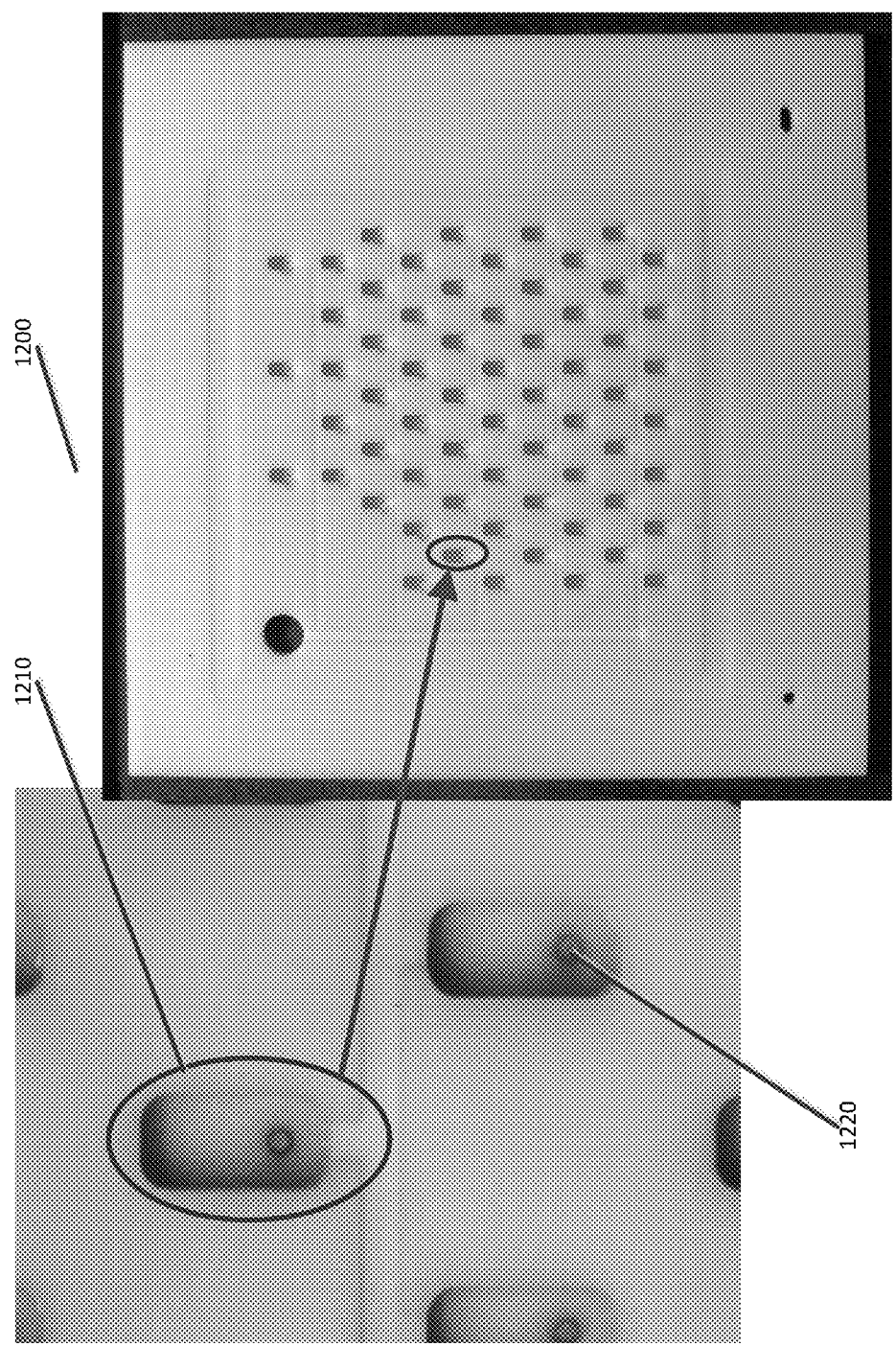
FIG. 12 illustrates a close up view of one such microcavity from FIG. 11 in accordance with one embodiment.

FIG. 12 illustrates a close up view of one such microcavity 1210 from FIG. 11 in accordance with one embodiment. Microcavity 1210, as shown in FIG. 12, includes a conductive via plug 1220 that electrically connects the bottom of the microcavity to the resistor pad and resistor on the back side of the rear substrate as shown in FIG. 13 below and FIG. 3a.

Figure 13:
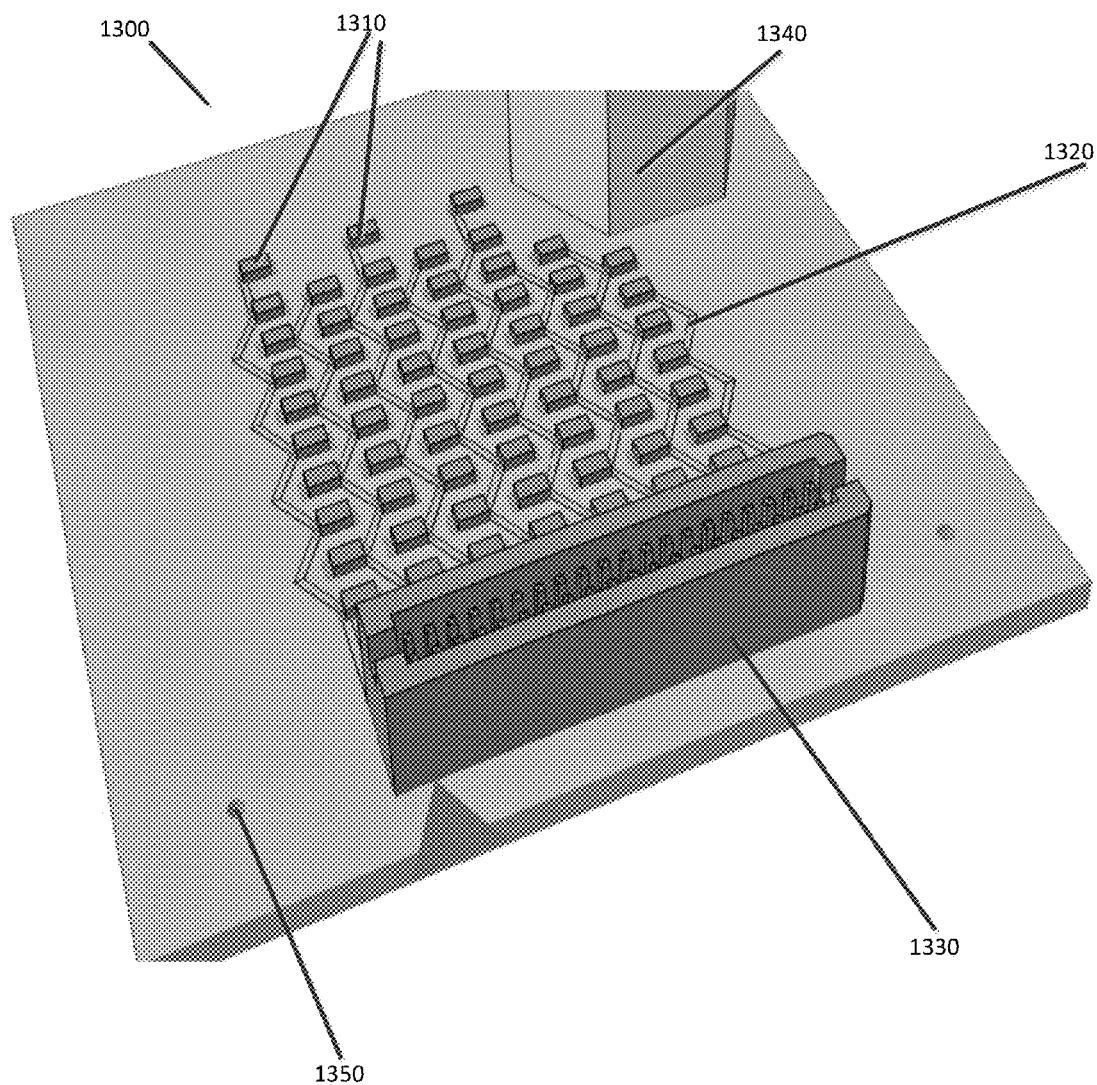
FIG. 13 illustrates a back side of a cavity plate such as that shown in FIGS. 3a, 4, 10, 11 and 12 in accordance with one embodiment.

FIG. 13 illustrates a back side of a cavity plate such as that shown in FIGS. 3a, 4, 10, 11 and 12 in accordance with one embodiment. The cavity plate 1300 includes discrete SMT resistors 1310 soldered to their pads connected to each cavity by a conductive via plug going from the back side to the front side as described above. Further included are zig-zag cathode bus-bars 1320 that terminate at the edge cable connector 1330. A panel gas-fill line stainless steel hex-fitting 1340 (to the gas-exhaust/gas-fill line) shown in the top right corner has been replaced by the gas tube fitting 1030 in FIG. 10. One of the alignment holes 1350 shown next to the connector has been modified to form a slot as shown in FIGS. 10 and 11.

The inclusion of the dielectric grid barrier rib structure that optically confines both the cell phosphor and discharge in a PDP as shown in FIG. 1 can be reconfigured in one embodiment with a metal layer coating to function in one embodiment as the microcavity cathode, as shown in FIGS. 3-6.

FIGS. 10, 11 and 12 provide an example of a microcavity in accordance with one embodiment. As can be seen in FIGS. 10, 11 and 12, the gas can flow through small gaps or channels along the top or bottom of the cavity wall, and surface mount resistors can be used to bridge between the cathode (i.e. discharge electrode) and the high voltage bus (shown in FIGS. 3a and 13). In another embodiment, the surface mount resistors are replaced by a thick-film resistive material deposited as a via plug in the via holes (i.e., replacing the via filled conductor) between the high voltage ("HV") bus lines and the underside of the cathode cavity (shown in FIGS. 3a, 11 and 12). In another embodiment, a discrete thick-film series quench resistor can be printed at the bottom of each cavity—i.e., between the cavity bottom and the high voltage bus electrode as shown in FIG. 5. For some applications it is not necessary to have an individual series quench resistor for each cavity cell, and for these embodiments one resistor can be used at the end of an electrode bus line or for a group of cavity cells.

Efficient minimum ionizing particle ("MIP") detection requires an electrode layout with a drift region typically on the order of about a millimeter or more (depending on the type of MIP as well as the gas mixture and pressure), coupled to a transverse electric field avalanche region typically of smaller dimension. This drift gap, similar to that used in thin-gap resistive plate chambers ("RPC"s), ensures that a minimum ionizing track yields at least one ion-pair with high probability at pressures that can approach atmospheric (e.g., 500 to 700 Torr) or even exceed atmospheric pressure.

Embodiments include electronics similar to the detectors disclosed in U.S. Pat. No. 7,332,726, and U.S. Pat. Pub. No. 2010/0265078, which count each discharge pulse as an event, and then base an amount of detected radiation on the number of counted events. Electronics can also use timestamp circuitry so that a single pulse is not counted as multiple events. Embodiments provide higher signal rates, faster timing, and more precise positional information than most other ionization sensing devices, but are expected to be similar with respect to triggering and readout possibilities. The speed of these devices reduces the probability of fake or ambiguous association of hits from the two orthogonal readouts. The relatively large signal size also distinguish microcavity-PPS devices from those that require high gain amplifiers prior to the hit processing.

Embodiments operate as highly-pixelated digital radiation detectors by flashing "ON" each pixel (which is normally "OFF") as a direct consequence of a gas discharge avalanche stimulated within the cell by incoming radiation, and so at their most basic level functionally behave as digital radiation counters and not as proportional counters. Each such gas discharge pulse is counted as having an approximately equal value by a discharge event detector and is therefore counted by the circuit as simply an individual event. The amount of detected radiation is thus based on how many individual gas discharge events are outputted from the pixels. The electronic readout circuitry is thus designed to detect if and when a gas discharge pulse is outputted from the pixel—i.e. when a pixel has turned "ON". In order to maximize the temporal resolution, the readout circuitry preserves the cell discharge output pulse rise time.

In this environment, very fast synchronous digital signal processing is directly applicable and can be flexibly implemented in large and fast FPGAs. FPGAs also provide largely parallel processing which further extends the data rates that can be handled. The processing of these signals can be via synchronous programmable logic, but for more demanding applications a conventional fiber-optic readout can be used with tracking and trigger algorithms.

Embodiments can exhibit single cell position resolution with nanosecond ("ns") and possibly sub-nanosecond timing resolution for hits separated by a dead time (i.e., recovery time) of the order of several ns. For embodiments requiring fast timing, the microcavity-PPS cells are relatively small, and can approach something on the order of a hundred microns. With the small cell size, fast sampling, and recovery time, embodiments can potentially deliver per square centimeter hit rates of more than 100 MHz. Association of hits on the two axes at this rate would generate many ghost hits were it not for the fast timing. For example, if a 2 ns coincidence between coordinate axes is assumed, multi-GHz signal rates per 10×10 cm sub-panel are possible while rejecting most ghost hits. A conservative fraction of that rate, 200 MHz per sub-panel, is well within the capability of a modern FPGA.

One embodiment uses FPGAs over ASICs because they are fast enough and have the important advantage of design flexibility. This flexibility is ideally suited to examine the temporal and positional information in the bit streams, and developing algorithms to associate, refine, and compact data from nearby cells into an overall cluster or track segment. For example, an embodiment with a design having one processing section to assemble the primitives (time and strip) with a second section to do correlations is flexible and offers significant data compaction (i.e., no hit, no bandwidth used).

In one embodiment for a small device designed for extremely high-rate counting, the electronics include "coincidence" logic. Hits are to be represented in 2 dimensions (for example, 16 bits×2), plus a time coordinate based on a synchronous 100 MHz clock and a 16 stage delay loop. The time coordinate can be represented as a 12 bit clock count with a 4 bit sub-interval, giving a sub-nanosecond time stamp. Transmitting these 48 bits continuously at 500 MHz is a non-trivial task. Therefore a simplified design would provide buffers with sufficient space to hold all 2 coordinate hits from multiple pixel firings, and multiplex these hits to a single 1.6 GHz fiber. Output from this fiber is then directed into a computer based fiber receiver. The high speed data flow from the sub-panel would be accepted until the fiber buffers reach a limit (typically ⅔ full). Later, when the computer has reduced the buffer content below ⅓, the buffer will be enabled to receive additional data.

The speed of the microcavity-PPS in accordance with one embodiment makes possible their use as trigger elements when adjacent layers are combined to define a trajectory compatible with particles of interest. A design where signals from adjacent layers are routed to a second layer of FPGAs from the primary signal sampling FPGA permits the development of complex trigger algorithms.

As disclosed, embodiments of the microcavity based plasma panel radiation detector/sensor can use structure from plasma panel displays to detect ionizing radiation. Embodiments and systems that incorporate embodiments can be used for the detection, tracking, identification, position sensing and/or imaging of ionizing particles, ionizing particle beams or photons generated by any means.

Embodiments designed for tracking will generally employ a stack of microcavity-PPS detectors, and embodiments designed for particle identification and/or tracking can also take advantage and utilize the fast timing characteristics of the microcavity-PPS including time-of-flight measurement.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A position-sensitive ionizing-radiation counting detector comprising:
   a first substrate;
   a second substrate coupled to the first substrate and defining a gas gap between the first substrate and the second substrate, wherein the first and second substrates comprise dielectrics;
   a discharge gas contained between the first and second substrate;
   at least one microcavity coupled to the second substrate;
   at least one anode electrode coupled to the first substrate;
   at least one cathode electrode coupled to the microcavity on the second substrate;
   a plurality of pixels, wherein each pixel is defined by a microcavity and an anode electrode coupled to a cathode electrode and each pixel is capable of generating a gas discharge counting event pulse upon interaction with ionizing-radiation;
   a resistor coupled to each of the cathode electrodes;
   a voltage bus coupled to each of the resistors;
   a power supply coupled to at least one of the electrodes;
   a discharge event detector coupled to at least one of the electrodes for detecting a gas discharge counting event in the electrode;
   circuitry for detecting if a gas discharge counting event pulse is output from the pixels, and for counting each such gas discharge pulse as an individual event and having an approximately equal value;
   wherein an amount of detected radiation is based on a total count of individual events.

2. The radiation detector of claim 1, further comprising a hermetic seal coupled between the first substrate and the second substrate.

3. The radiation detector of claim 1, wherein each of the cathode electrodes comprise metallized inner walls of the microcavity.

4. The radiation detector of claim 3, wherein each microcavity comprises a conductive via electrically coupling a cavity cathode on one side of the second substrate to the resistor on the other side of the second substrate.

5. The radiation detector of claim 4, wherein the resistor comprises a thick-film printed resistor.

6. The radiation detector of claim 4, wherein the resistor comprises a surface mount resistor.

7. The radiation detector of claim 4, wherein a conductive via plug electrically couples a microcavity anode on one side of the first substrate to a sense line on the other side of the first substrate.

8. The radiation detector of claim 3, wherein each microcavity comprises a resistive via plug electrically coupling a microcavity cathode on one side of the second substrate to a voltage bus bar on other side of the second substrate.

9. The radiation detector of claim 8, wherein a conductive via plug electrically couples the microcavity anode on one side of the first substrate to a sense line on the other side of the first substrate.

10. The radiation detector of claim 1, further comprising:
    a gas evacuation and gas fill channel;
    a gas tube hole;
    a hermetic seal groove; and
    alignment holes.

11. A position-sensitive ionizing-radiation counting detector comprising:
    a first substrate;
    a second substrate coupled to the first substrate and defining a gas gap between the first substrate and the second substrate, wherein both substrates are dielectrics;
    a discharge gas contained between the first and second substrate;
    at least one microcavity coupled to the second substrate;
    at least one anode electrode coupled to the first substrate;
    at least one cathode electrode coupled to the microcavity on the second substrate, wherein each cathode electrode comprises a metallization layer over the inner walls of the microcavity;
    a plurality of pixels, wherein each pixel is defined by a microcavity and an anode electrode coupled to a cathode electrode and each pixel is capable of generating a gas discharge counting event pulse upon interaction with ionizing-radiation;
    a via plug going from the microcavity on one side of the second substrate to the other side of the second substrate;
    a resistor coupled to each of the cathode electrodes;
    a voltage bus coupled to each of the resistors;
    a power supply coupled to at least one of the electrodes;
    a discharge event detector coupled to at least one of the electrodes for detecting a gas discharge counting event in the electrode;
    circuitry for detecting if a gas discharge counting event pulse is output from the pixels, and for counting each such gas discharge pulse as an individual event and having an approximately equal value;
    wherein an amount of detected radiation is based on a total count of individual events.

12. The radiation detector of claim 11, wherein the via plug is a thick-film conductor connecting the resistor to the microcavity.

13. The radiation detector of claim 12, wherein a conductive via plug electrically couples the microcavity anode on one side of the first substrate to a sense line on the other side of the first substrate.

14. The radiation detector of claim 13, further comprising:
a gas evacuation and gas fill channel;
a gas tube hole;
a hermetic seal groove; and
alignment holes.

15. The radiation detector of claim 11, wherein the via plug is a thick-film resistor coupling the microcavity to a voltage bus bar.

16. The radiation detector of claim 15, wherein a conductive via plug electrically couples the microcavity anode on one side of the first substrate to a sense line on the other side of the first substrate.

17. The radiation detector of claim 11, further comprising a hermetic seal coupled between the first substrate and the second substrate.

18. The radiation detector of claim 17, wherein a conductive via plug electrically couples the microcavity anode on one side of the first substrate to a sense line on the other side of the first substrate.

19. The radiation detector of claim 11, wherein a conductive via plug electrically couples the microcavity anode on one side of the first substrate to a sense line on the other side of the first substrate.

20. A method of detecting ionizing-radiation based on a counting of gas discharge events, the method comprising:
receiving ionizing-radiation at a first substrate of a plasma panel, the plasma panel having a second substrate and at least one microcavity coupled to the second substrate;
creating at least one ion-pair in a gas contained within a microcavity gas gap between the first and second substrates;
causing a gas-discharge event at a pixel site of the plasma panel, each pixel site defined by a microcavity having an anode and cathode and quench resistor, wherein the event is isolated and formed in a microcavity; and
counting a plurality of the gas-discharge events at a pulse detector coupled to either the anode or the cathode, wherein each of the gas-discharge events is counted as approximately an equal value;
wherein the anode is coupled to the first substrate and the cathode is coupled to the microcavity;
wherein each pixel site is capable of generating the gas-discharge counting event pulse upon interaction with ionizing-radiation;
wherein the quench resistor coupled to the cathode and a voltage bus is coupled to the quench resistor and a power supply is coupled to at least one cathode or anode.

* * * * *

UNITED STATES PATENT AND TRADEMARK OFFICE
CERTIFICATE OF CORRECTION

PATENT NO. : 9,529,099 B2
APPLICATION NO. : 14/080218
DATED : December 27, 2016
INVENTOR(S) : Peter S. Friedman It is certified that error appears in the above-identified patent and that said Letters Patent is hereby corrected as shown below:

On the Title Page

Item (73), Assignees, replace "University of Michigan" with --The Regents of the University of Michigan--

In the Specification

Column 1:
Line 8, insert --Government License Rights
This invention was made with government support under grants DE-SC0013962 and DE-SC0007877 awarded by the U.S. Department of Energy. The government has certain rights in the invention.--

Signed and Sealed this
Third Day of October, 2017

Joseph Matal
*Performing the Functions and Duties of the*
*Under Secretary of Commerce for Intellectual Property and*
*Director of the United States Patent and Trademark Office*